United States Patent
Lin et al.

(10) Patent No.: US 11,501,165 B2
(45) Date of Patent: Nov. 15, 2022

(54) CONTRASTIVE NEURAL NETWORK TRAINING IN AN ACTIVE LEARNING ENVIRONMENT

(71) Applicant: International Business Machines Corporation, Armonk, NY (US)

(72) Inventors: Chen Lin, Elmsford, NY (US); Hongtan Sun, Armonk, NY (US); John Rofrano, Mahopac, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/809,319

(22) Filed: Mar. 4, 2020

(65) Prior Publication Data

US 2021/0279566 A1 Sep. 9, 2021

(51) Int. Cl.
*G06K 9/62* (2022.01)
*G06N 3/08* (2006.01)
*G06N 20/00* (2019.01)

(52) U.S. Cl.
CPC ............. *G06N 3/08* (2013.01); *G06K 9/6218* (2013.01); *G06K 9/6227* (2013.01); *G06K 9/6256* (2013.01); *G06K 9/6262* (2013.01); *G06N 20/00* (2019.01)

(58) Field of Classification Search
CPC ........ G06N 3/08; G06N 20/00; G06N 3/0454; G06K 9/6218; G06K 9/6227; G06K 9/6256; G06K 9/6262; G06K 9/6226; G06K 9/6272; G06V 10/82
See application file for complete search history.

(56) References Cited

U.S. PATENT DOCUMENTS

| 7,483,864 B2 | 1/2009 | Osoda et al. |
| 8,838,507 B2 | 9/2014 | Camerer et al. |
| 9,122,681 B2 | 9/2015 | Cormack et al. |

(Continued)

FOREIGN PATENT DOCUMENTS

| WO | 2009051915 | 4/2009 |
| WO | 2017101142 | 6/2017 |

OTHER PUBLICATIONS

Zhou et al., "Online Incremental Feature Learning with Denoising Autoencoders", 2012. (Year: 2012).*

(Continued)

*Primary Examiner* — Phuoc Tran
(74) *Attorney, Agent, or Firm* — Lieberman & Brandsdorfer, LLC

(57) ABSTRACT

Embodiments relate to a system, program product, and method for training a contrastive neural network (CNN) in an active learning environment. A neural network is pre-trained with labeled data of a historical (first) dataset. The CNN is trained for a new (second) dataset by applying the new dataset and contrasting the new dataset against the historical dataset to extract novel patterns. Weights of a knowledge operator from the pre-trained neural network are borrowed. Features novel to the new dataset are learned, including updating weights of the knowledge operator. The borrowed knowledge operator weights are combined with the updated knowledge operator weights. The CNN is leveraged to predict one or more labels for the new dataset as output data.

20 Claims, 8 Drawing Sheets

(56) References Cited

U.S. PATENT DOCUMENTS

| | | |
|---|---|---|
| 10,402,701 B2 | 9/2019 | Sohn et al. |
| 2015/0254555 A1 | 9/2015 | Williams, Jr. et al. |
| 2018/0300576 A1 | 10/2018 | Dalyac et al. |
| 2020/0276703 A1* | 9/2020 | Chebotar .......... G05B 13/0205 |

OTHER PUBLICATIONS

Parisi et al., "Continual lifelong learning with neural networks: A review", 2019. (Year: 2019).*

* cited by examiner

CONTRASTIVE NEURAL NETWORK TRAINING IN AN ACTIVE LEARNING ENVIRONMENT

BACKGROUND

The present embodiments relate to training a contrastive neural network in an active learning environment. More specifically, the embodiments relate to identifying novel patterns in a new dataset for a prediction accuracy assessment to further train the contrastive neural network.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. ML is the application of AI through creation of models, including neural networks that can demonstrate learning behavior by performing tasks that are not explicitly programmed. Supervised learning is a type of ML in which machines classify objects based on related data on which the machine has been trained. More specifically, supervised learning is trained with input and output data, and patterns present in the training data.

At the core of AI and associated reasoning lies the concept of similarity. The process of understanding and object recognition requires reasoning from a relational perspective that can be challenging. Supervised learning dictates an output for a given determinate input, but may be subject to failure when there is a novel pattern in new data. The model does not adapt to a new dataset. This training paradigm relies on the fact that training and test data are drawn from the same distribution, which may not always be true in a real world setting, e.g. synthesized training data, single source, etc. If there are novel patterns specialized in the new data but are absent from the training data, the model may not perform well. Accordingly, there is need to leverage the knowledge from the training model so that it can be adapted to new patterns in the new data.

SUMMARY

The embodiments include a system, computer program product, and method for inducing creativity in an artificial neural network.

In one aspect, a system is provided for use with an artificial intelligence (AI) platform to train a contrastive neural network (CNN) in an active learning environment. The system includes a server with a processing unit operatively coupled to memory and in communication with the AI platform, which is embedded with tools in the form of a pre-training manager, a training manager, and a prediction manager. The pre-training manager functions to feed a historical dataset into a selected neural network. The pre-training manager further functions to pre-train the selected neural network with labeled data in the historical dataset. The pre-training includes training weights of layers of the selected neural network. The training manager functions to train the CNN for a new dataset including borrowed weights from the pre-trained neural network, learn features novel to the new dataset, including update weights of the knowledge operator, and combine the borrowed weights with the updated weights. The prediction manager functions to leverage the CNN to predict one or more labels for the new dataset as output data.

In another aspect, a computer program product is provided to train a contrastive neural network (CNN) in an active learning environment. The computer program product includes a computer readable storage medium with embodied program code that is executable by a processing unit. Program code is provided to feed a historical dataset into a selected neural network. The selected neural network is pre-trained with labeled data in the historical dataset. The pre-training includes training weights of layers of the selected neural network. Program code is provided to train the CNN for a new dataset including applying the new dataset to the selected neural network and learning features of the new dataset that are shared with the historical dataset. The weights from a knowledge operator are borrowed from the pre-trained neural network, features novel to the new dataset are learned, including updating weights of the knowledge operator, and the borrowed weights are combined with the updated weights. Program code is further provided to leverage the CNN to predict one or more labels for the new dataset as output data.

In yet another aspect, a method is provided for training a contrastive neural network (CNN) in an active learning environment. A historical dataset is fed into a selected neural network. The selected neural network is pre-trained with labeled data in the historical dataset. The pre-training includes training weights of layers of the selected neural network. The CNN is trained for a new dataset including applying the new dataset to the selected neural network and learning features of the new dataset that are shared with the historical dataset. The weights from a knowledge operator are borrowed from the pre-trained neural network, features novel to the new dataset are learned, including updating weights of the knowledge operator, and the borrowed weights are combined with the updated weights. The CNN is leveraged to predict one or more labels for the new dataset as output data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
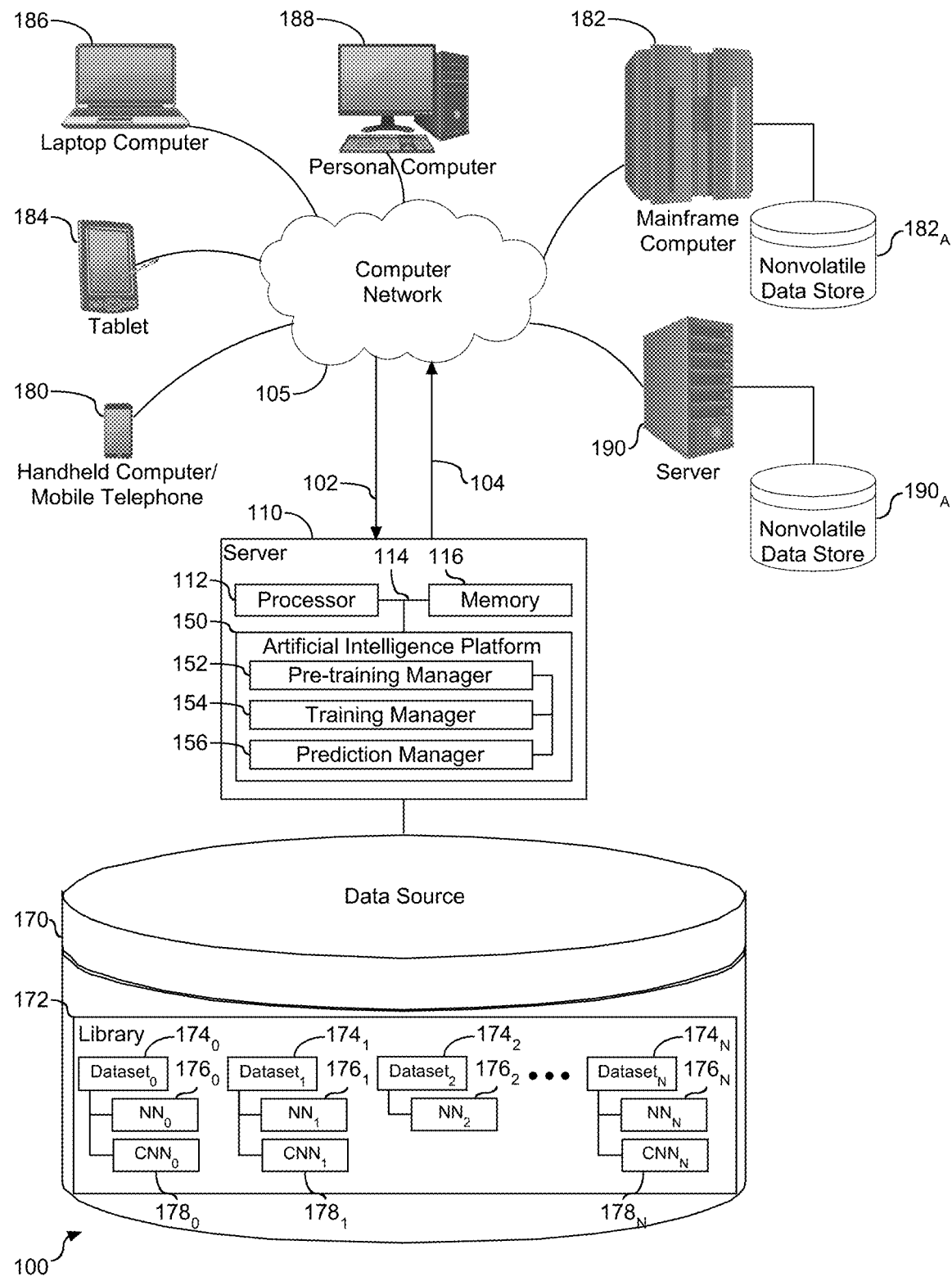
FIG. 1 depicts a system diagram illustrating a computer system with an artificial intelligence platform.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Neural networks are models of the way the nervous system operates. Basic units are referred to as neurons, which are typically organized into layers. The neural network functions by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Complex neural networks are designed to emulate how the human brain works, so computers can be trained to support poorly defined abstractions and problems. Neural networks and corresponding learning algorithms are often used in image recognition, speech, and computer vision applications.

Currently, when given a task, a ML model in a neural network is trained using an existing set of examples, i.e., historical data. Once the training is complete, the model is fixed and deployed to accomplish the task. New data is entered into the neural network, processed, and the trained ML model is applied to make a production. At this point there is no further training or development of the ML model. This trained model relies on the fact that the historical and new data are drawn from the same distribution which may not always be true in a real-world setting. If there are novel patterns present in the new data which are absent from the historical data, then the trained ML model may not perform well. A method, product, and system are shown herein and described in detail with the supporting drawing figures in which a contrastive neural network (CNN) leverages historical data and associated patterns and adapt those patterns to a new data set, and further train and develop the CNN with the novel patterns from the new data in an active learning environment so that the CNN evolves.

Referring to FIG. 1, a schematic diagram of a computer system (100) to induce creativity in an artificial neural network is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) to create and utilize a CNN to adapt prior annotation knowledge to a new dataset. The new dataset and corresponding output from the CNN may be communicated over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to create and support functionality of the CNN. The tools function to develop the CNN in an active learning environment so that the model evolves and adapts with introduction and presentation of new data sets. The tools include, but are not limited to, a pre-training manager (152), a training manager (154), and a prediction manager (156). The AI platform (150) may receive input from the network (105) and leverage a data source (170), also referred to herein as a corpus or knowledge base, to selectively access historical datasets, trained neural networks, and CNNs. As shown the data source (170) is configured with a library (172) with one or more CNNs that are supported and managed by the tools (152)-(156). Although only one library is shown, in one embodiment, the data source (170) may be configured with multiple libraries. The library (172) is shown with a plurality of historical datasets, including $dataset_0$ (174$_0$), $dataset_1$ (174$_1$), $dataset_2$ (174$_2$), ..., $dataset_N$ (174$_N$). The quantity of historical datasets shown is for illustrative purposes and should not be considered limiting. Historical dataset are shown with an operatively connected neural network (NN) that has been trained by the historical dataset. Training the neural network with the historical data set is discussed in greater detail in FIG. 3. As shown $NN_0$ (176$_0$) is operatively coupled to $dataset_0$ (174$_0$), $NN_1$ (176$_1$) is operatively coupled to $dataset_1$ (174$_1$), $NN_2$ (176$_2$) is operatively coupled to $dataset_2$ (174$_2$), and $NN_N$ (176$_N$) is shown operatively coupled to $dataset_N$ (174$_N$). Accordingly, a historical data set as defined herein is an existing data set that has been captured and reflected in a corresponding neural network.

The AI platform (150) is shown herein with several tools to support training one or more CNNs in an active learning environment. The training is separated and defined into two stages, including a pre-training stage and a training stage. The pre-training manager (152) functions to support the pre-training stage, which encompasses an initial training of a neural network with a historical dataset. The historical dataset contains annotated data, also referred to herein as labeled data, which is used for training the weights of the layers of the selected neural network. The pre-training manager (152) uses the annotated data from the historical dataset to train the neural network, and more specifically to train a knowledge operator within the neural network. Once trained, the neural network is operatively or logically coupled to the corresponding data set, as shown in the data source (170). Accordingly, the pre-training manager (152) uses the annotated data of the historical data set to train weights of the layers of the corresponding and selected neural network.

The training manager (154), shown herein operatively coupled to the pre-training manager (152), functions to create and train a CNN for a new dataset, e.g. non-historical dataset. The training manager (154) selects a previously trained neural network. In one embodiment, the selection is based on proximity of the new dataset to the historical dataset. The training manager (154) applies the new dataset to the selected neural network to train a contrastive neural network (CNN) to learn the novel features in the new dataset while transferring knowledge from the weights of the neural network trained by the pre-training manager (152). In one embodiment, the selected or identified neural network corresponding historical dataset is directed at the historical dataset that the training manager (154) determines to be the most similar to the new dataset. The selected or identified new dataset is compared to the selected historical dataset to identify shared data patterns between the data sets, while also identifying new patterns in the new dataset that are not present, e.g. absent, in the historical dataset. Weight transfer, also referred to herein as borrowing weights, is directed at the knowledge operator(s) of the trained neural network. The knowledge operator(s) functions as a regularizer for the CNN. The application of the new dataset to the selected neural model by the training manager (154) functions as a comparison of the new dataset to a corresponding historical dataset ($174_0 \ldots 174_N$) selected by the training manager (154) from the library (172). The training manager (154) extracts and preserves new patterns prior to training the CNN, while masking irrelevant information, such as recognized patterns. This process of preserving and masking data is also referred to as de-noising. The training manager (154) organizes the extracted novel patterns into clusters, where novel patterns containing similar data are identified and placed into one or more clusters based on commonality or overlapping characteristics. In one embodiment, the novel patterns are organized into clusters or groups using expectation maximization (EM) clustering with a Gaussian mixture model (GMM). Accordingly, the training manager (154) applies the new data set to the neural network and identifies and preserves novel patterns in the new dataset that are not recognized by the neural network from the previously trained data.

The training manager (154) leverages the previously trained neural network to perform an annotation prediction on identified new data items. The training manager (154) leverages the clusters to evaluate the annotation prediction and conduct an initial accuracy assessment. Clusters are subject to selective processing, as shown and described in FIG. 3. With respect to the training manager (154), as clusters are selectively identified, a random selection of data within the selected cluster is sampled, and an initial accuracy assessment of the corresponding annotations within the cluster is conducted. In one embodiment, the training manager (154) samples a similar or the same quantity of data from each selectively identified cluster. This initial accuracy assessment provides a baseline assessment of the accuracy of the annotations of data assigned to the respective cluster. Accordingly, the accuracy assessment reflects a prediction accuracy percentage of the annotations present in the respective cluster.

The training manager (154) dynamically leverages the initial accuracy assessment to select a cluster from which samples of data will be drawn for annotation. It is understood in the art that there are several algorithms that may be utilized for the dynamic cluster selection. In one embodiment, the training manager (154) applies a multi-arm bandit algorithm with respect to the predication accuracy of the clusters to make the dynamic cluster selection. In one embodiment, the data evaluation and annotation is conducted by a subject matter expert (SME). Once cluster selection has taken place, the SME reviews samples of the annotations within the selected cluster and further annotates or amends existing annotations in which there is a disagreement. An annotation amendment is referred to herein as an updated annotation. The training manager (154) applies the updated annotations to the CNN, and trains a new knowledge operator in the CNN with the weights of the previous data annotations. In other words, the training manager (154) applies the knowledge of the weights associated with the historical data and data annotations to train the new knowledge operator of the CNN. Accordingly, the training manager (154) applies both non-amended annotations and amended annotations to the CNN, to effectively train a new neural network.

In addition to or as part of the neural network training, the training manager (154) re-assesses the predication accuracy of the reviewed cluster and dynamically selects a new cluster for review while accounting for the revised prediction accuracy of any previously reviewed cluster. Accordingly, the training manager (154) applies the new dataset to the neural network associated with corresponding or identified historical data, and trains the CNN, effectively creating a new neural network with both recognized and novel features present in the new dataset.

The training manager (154) creates a CNN, wherein the created CNN is a newly created version of the neural network selected by the pre-training manager (152) that functions to combine the previously trained old knowledge operator with the new knowledge operator. The combination of the old and new knowledge operator effectively creates a new machine learning classifier in the CNN for making annotation predictions. The new machine learning classifier leverages the weights from both the old knowledge operators of the neural network associated with the historical dataset and new knowledge operators of the neural network associated with the new dataset. The created CNN is operatively attached to the corresponding neural network of the historical dataset and saved in the library (172). As shown, $CNN_0$ ($178_0$) is shown operatively coupled to $NN_0$ ($176_0$), $CNN_1$ ($178_1$) is shown operatively coupled to $NN_1$ ($176_1$), and $CNN_N$ ($178_N$) is shown operatively coupled to $NN_N$ ($176_N$). The created CNN effectively functions as an updated version of the neural network. Not every neural network in the library (172) will have an operatively coupled CNN. A neural network will only have an operatively coupled CNN if the neural network and the corresponding historical dataset have been leveraged to learn the new dataset. By way of example, $NN_2$ (176$_2$) and dataset$_2$ (174$_2$) have not been leveraged to learn a new dataset, and as such $NN_2$ (176$_2$) is not shown with a corresponding CNN. In one embodiment, a new dataset reflected in a corresponding CNN may be retained or operatively coupled to the CNN in the knowledge base (170). The prediction manager (156), shown operatively coupled to the training manager (154) leverages the newly created machine learning classifier of the CNN to output a predication of the new dataset in the form of one or more annotations.

The network (105) may include local network connections and remote connections in various embodiments, such that the AI platform (150) may operate in environments of any size, including local and global, e.g. the Internet. The AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

In some illustrative embodiments, server (110) may be the IBM Watson® system available from International Business Machines Corporation of Armonk, N.Y., is augmented with the mechanisms of the illustrative embodiments described hereafter. The IBM Watson® system receives electronic communication as input content (102) which it then subjects to processing through a model. Based on application of the content (102) to the model, the CNN is trained in an active learning environment.

The pre-training manager (152), training manager (154), and the prediction manager (156), hereinafter referred to collectively as AI tools or AI platform tools, are shown as being embodied in or integrated within the AI platform (150) of the server (110). The AI tools may be implemented in a separate computing system (e.g., 190) that is connected across network (105) to the server (110). Wherever embodied, the AI tools function to train the CNN in an active learning environment.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

An information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
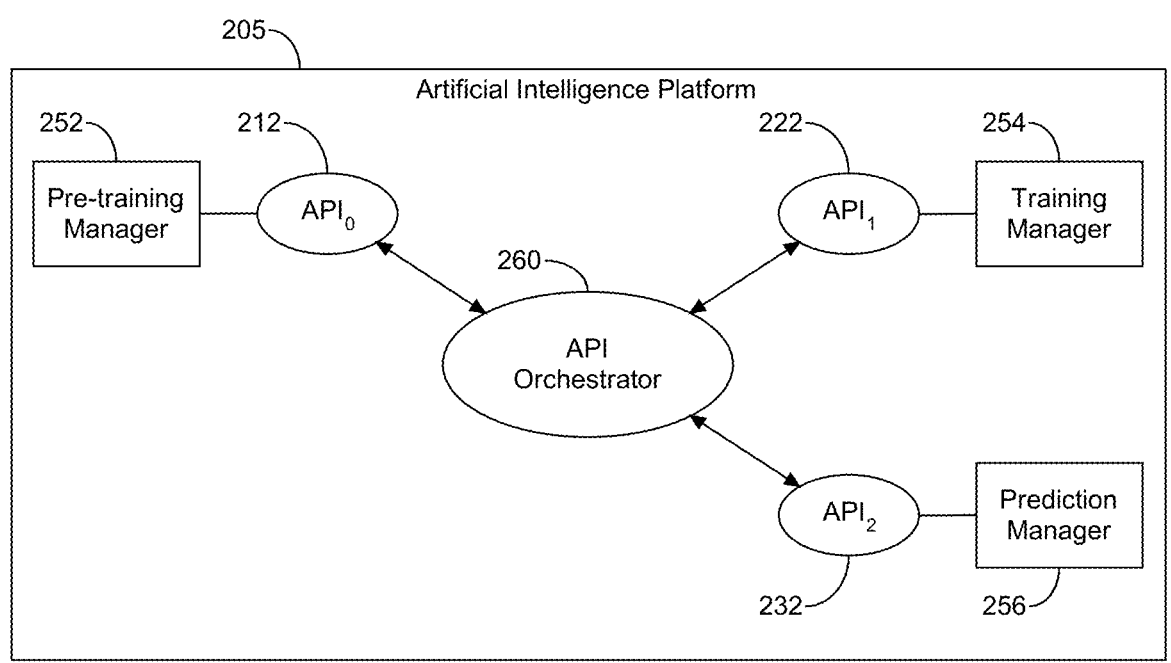
FIG. 2 depicts a block diagram illustrating artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 2, a block diagram (200) is provided illustrating the tools (152)-(156) and their associated APIs. As shown, a plurality of tools are embedded within the AI platform (205), with the tools including the pre-training manager (252) associated with $API_0$ (212), the training manager (254) associated with $API_1$ (222), and the prediction manager (256) associated with $API_2$ (232). Each of the APIs may be implemented in one or more languages and interface specifications. $API_0$ (212) provides functional support to pre-train the selected neural network with the historic dataset; $API_1$ (222) provides functional support to train the CNN with novel features of the new dataset; and $API_2$ (232) provides functional support to leverage a newly created machine learning classifier to make an annotation prediction for newly entered data. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
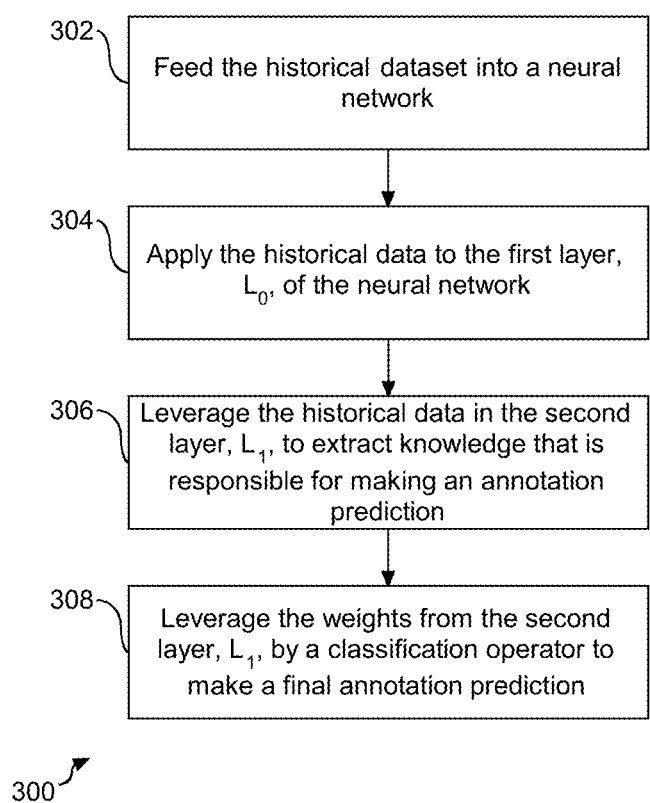
FIG. 3 depicts a flow chart illustrating a method for training a neural network.

Referring to FIG. 3, a flow chart (300) is provided to illustrate a method for training a neural network. It is understood in the art that the new network is specific to a task, and as such, the neural network described herein is determined by a corresponding task. A historical dataset refers to an annotated dataset, also known as a labeled dataset. As shown and described herein, the annotated dataset is fed into an existing neural network to train an old or existing neural network and corresponding knowledge operators of the layers of the old or existing neural network. (302). The historical data is applied to the first layer, $L_0$, of the neural network wherein common latent variables are encoded and saved as a condensed representation of the data (304). Since this is an existing neural network, the knowledge operator trained using the historical data is referred to as the old knowledge operator. The condensed representations of the historical data from the first layer, $L_0$, are leveraged by the knowledge operator in the second layer, $L_1$, of the neural network to extract knowledge or characteristics from the data that is responsible for making an annotation prediction (306). More specifically, the weights of the second layer, $L_1$, process input data from the first layer, $L_0$, to identify a second of data ranges that correspond and support an output range. The knowledge operator of the third layer, $L_2$, applies weights to the condensed representations of the historical data. As shown herein, the weights from the second layer, $L_1$, are leveraged by the third layer, also referred to as a classification operator, to make a final annotation prediction (308). The prediction made by the classification operator is in the form of an annotation, e.g. label, applied to the data. Accordingly, an old knowledge operator in a neural network is trained with annotation data to output predictions in the form of annotations.

Figure 4:
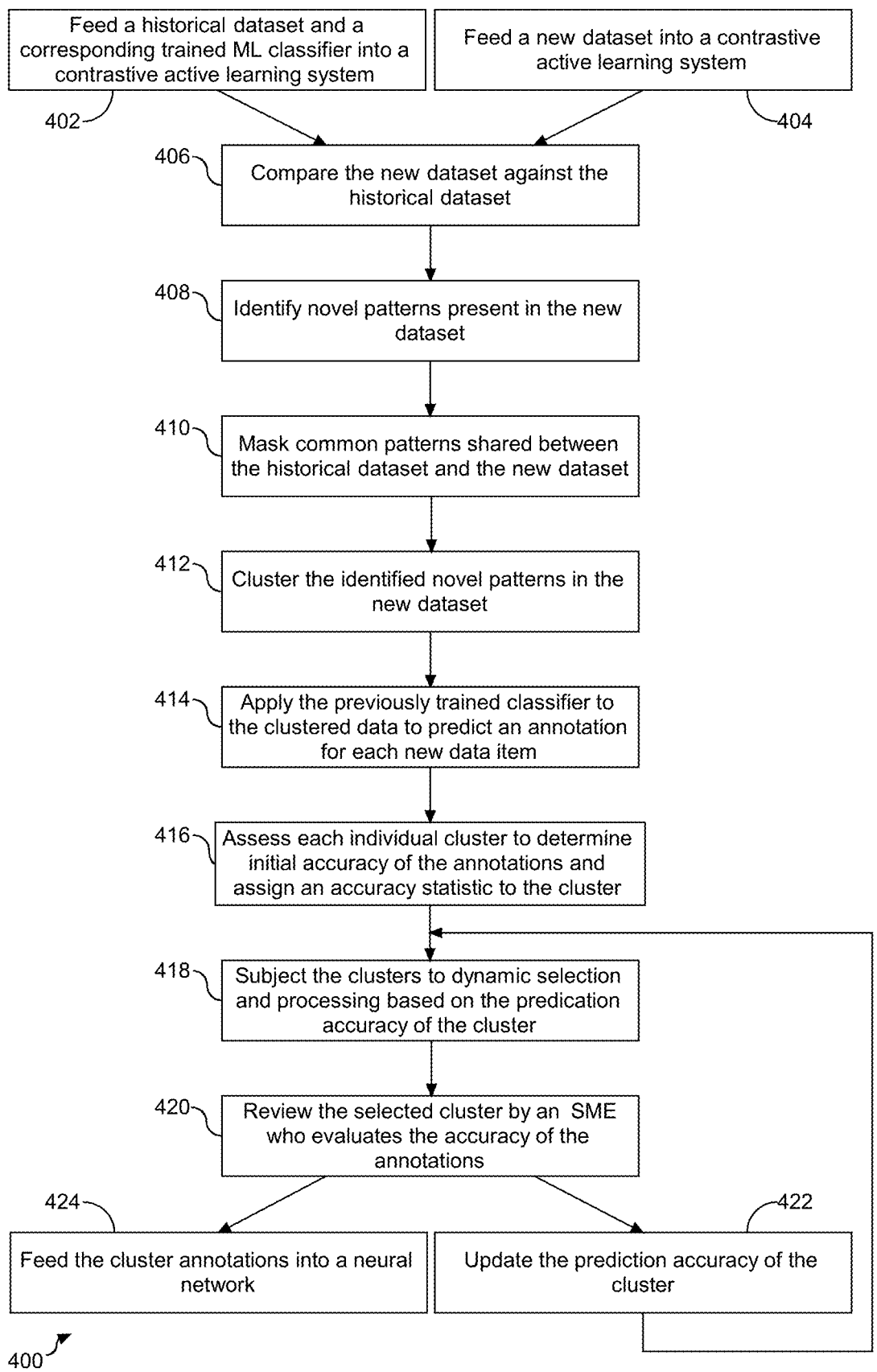
FIG. 4 depicts a flow chart illustrating a process for training a neural network to learn how to manage novel patterns in a new dataset while leveraging prior knowledge.

Referring to FIG. 4, a flow chart (400) is provided to illustrate a process for training a contrastive neural network (CNN) to learn how to manage novel patterns in a new dataset while leveraging prior knowledge from an existing and trained neural network. With respect to data annotation, the CNN mitigates labeling due to active learning and the incorporation of past knowledge. As shown, there are two sources of input. The first source, also referred to as $input_0$, is an annotated dataset, e.g. historical data set, and a corresponding trained machine learning (ML) classifier (402). The second source, also referred to as $input_1$, is a non-annotated dataset, e.g. new dataset, (404). The first source, (402), and the second source (404), are fed into a contrastive active learning system, either sequentially or in parallel, where the new data in the new dataset is compared against historical or annotated data in the historical dataset (406). Novel patterns present in the new dataset, but not in the historical dataset, are identified (408), and common patterns between the annotated data of the historical dataset and the new data are subject to masking (410). In one embodiment, the process of preserving novel data and masking irrelevant data is referred to as de-noising. The process of masking effectively disregards characteristics of the data that are common between the two datasets. Accordingly, the initial processing entails identification of novel patterns in the new dataset, and removal of noise.

The novel patterns in the new dataset are analyzed and subject to clustering, wherein novel patterns containing similar data are identified and placed into one or more clusters based on commonality (412). In one embodiment, at step (412) the novel patterns are organized using expectation maximization (EM) clustering with a Gaussian mixture model (GMM). A number of clusters are selected and the parameters for each cluster are initialized. The probability for each data item belonging to a particular cluster is calculated and a new set of parameters is determined for the Gaussian distributions. This process is continued until there is minimal variation remaining in the clustering assignments of the data items. For each data item, a previously trained machine learning classifier, such as the classifier shown and described in FIG. 3, is applied to the clustered data to predict an annotation for each new data item (414). It is understood that the annotation prediction is based on the historical data set and does not account for new patterns that may be present in the new dataset.

The clusters are leveraged to evaluate the annotation prediction. As shown herein, the clusters are individually subject to review or assessment to evaluate accuracy of the annotation prediction. During the individual cluster assessment, a random selection of data is sampled, an initial accuracy of the annotations within the cluster is defined, and an accuracy statistic, e.g. percentage, is assigned to the cluster (416). In one embodiment, a similar or the same quantity of data is sampled from each cluster. In one embodiment, the sampling entails a human-in-the loop where a subject matter expert (SME) samples the data items and evaluates the annotation accuracy. The initial evaluation at step (416) provides a baseline assessment of the accuracy of the annotations of each cluster. This accuracy can be displayed as a prediction accuracy percentage of the labels present in each cluster.

Following the initial cluster evaluation at step (416), the clusters are subject to dynamic selection and processing based on a characteristic associated with the predication accuracy of the cluster (418). In one embodiment, a multi-arm bandit algorithm technique is utilized for the dynamic cluster selection to ensure equitable annotation review across the clusters. The selected cluster is reviewed by a subject matter expert (SME), e.g. human-in-the-loop, who randomly draws annotation samples within the selected cluster and evaluates the accuracy or correctness of those randomly selected annotations (420). More specifically, at step (420) the SME may agree or disagree with the machine annotation assigned based on the previously trained classifier from FIG. 3, and updates the annotations that they have determined to be inaccurate. The process shown herein is subject to a bifurcation. As shown, after annotation of the selected cluster is complete the predication accuracy of the cluster is updated (422) and returns to step (418) for dynamic selection of the next cluster for annotation review by the SME (420). In addition, the cluster annotations are fed into a neural network, which in an embodiment is a contrastive neural network (CNN), to learn novel knowledge while leveraging shared knowledge of the historical dataset (424), as shown and described in FIG. 5. Accordingly, clusters are formed and dynamically selected for annotation assessment to train the neural network in conjunction with the previously trained old knowledge operator, effectively creating a new machine learning classifier for annotation prediction output.

Figure 5:
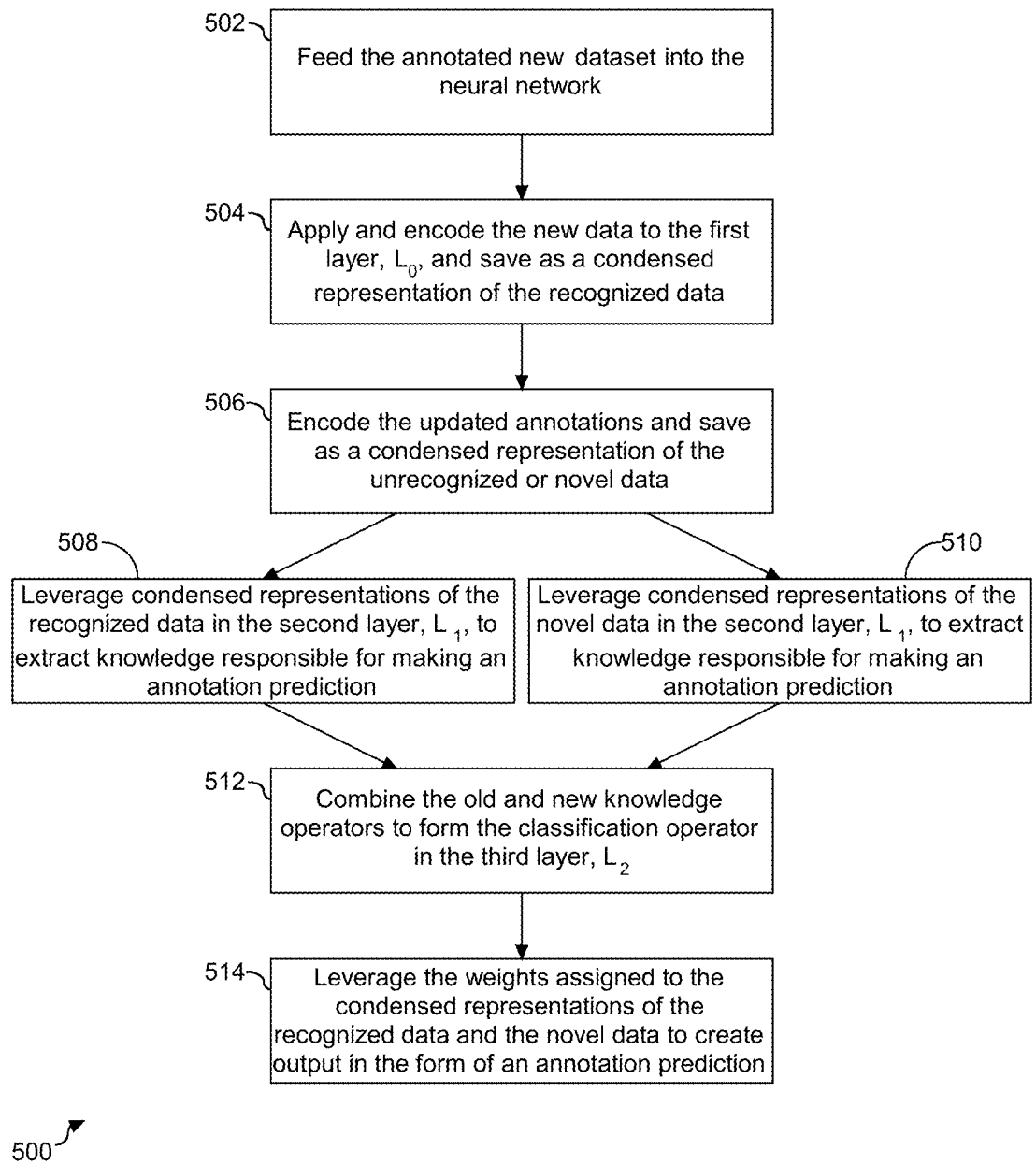
FIG. 5 depicts a flow chart illustrating training the contrastive neural network with the subject matter expert updated annotations as shown in FIG. 4.

Referring to FIG. 5, a flow chart (500) is provided to illustrate training the neural network with the SME updated annotations as shown in FIG. 4. As shown and described, the annotated new dataset is fed into the neural network (502). The new data is applied to the first layer, $L_0$, of the neural network where recognized data points are encoded by the common latent variables encoder and saved as a condensed representation of the recognized data (504). The updated annotations provided by the SME in FIG. 4 are encoded by the novel latent variable encoder and saved as a condensed representation of the unrecognized or novel data (506). The condensed representations of the recognized data are leveraged by the old knowledge operator in the second layer, $L_1$, of the neural network to extract knowledge from the data that is responsible for making an annotation prediction for data recognized from the previous training (508), as shown in FIG. 3. Concurrent to step (508), the condensed representations of the novel data are leveraged by the new knowledge operator in the second layer, $L_1$, of the neural network to extract knowledge from the data that is responsible for making an annotation prediction for data unrecognized by the previously trained neural network (510). The old knowledge operator and the new knowledge operator are combined to form the classification operator in the third layer, $L_2$, of the neural network (512). The classification operator leverages the weights assigned to the condensed representations of the recognized data and the novel data to create output in the form of an annotation prediction (514). Accordingly the classification operator is updated with both the old knowledge operator and the new knowledge operator, effectively creating a new machine learning classifier for annotation prediction output.

A possible use case for training a contrastive neural network in an active learning environment is training an insight module in a cloud innovative toolkit (CIT). Normally, a SME is tasked with overriding wrong classification results in the insight module in the CIT. However, employing a neural network in the active learning environment of the CIT, classifiers associated with the insight module are trained to make prediction data such as workload disposition, target platform, and transformation technique using information such as operating system and memory. A modernization can also be trained using the neural network to classify the modernization target based on information such as business criticality level, complexity of the application, number of transactions, language, and status-transformation. Currently this classification is carried out through consulting. Accordingly, the neural network shown and described in FIGS. 1-5, mitigates the requirements of the human-in-the-loop component in the active learning environment.

Aspects of the functional tools (152)-(156) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
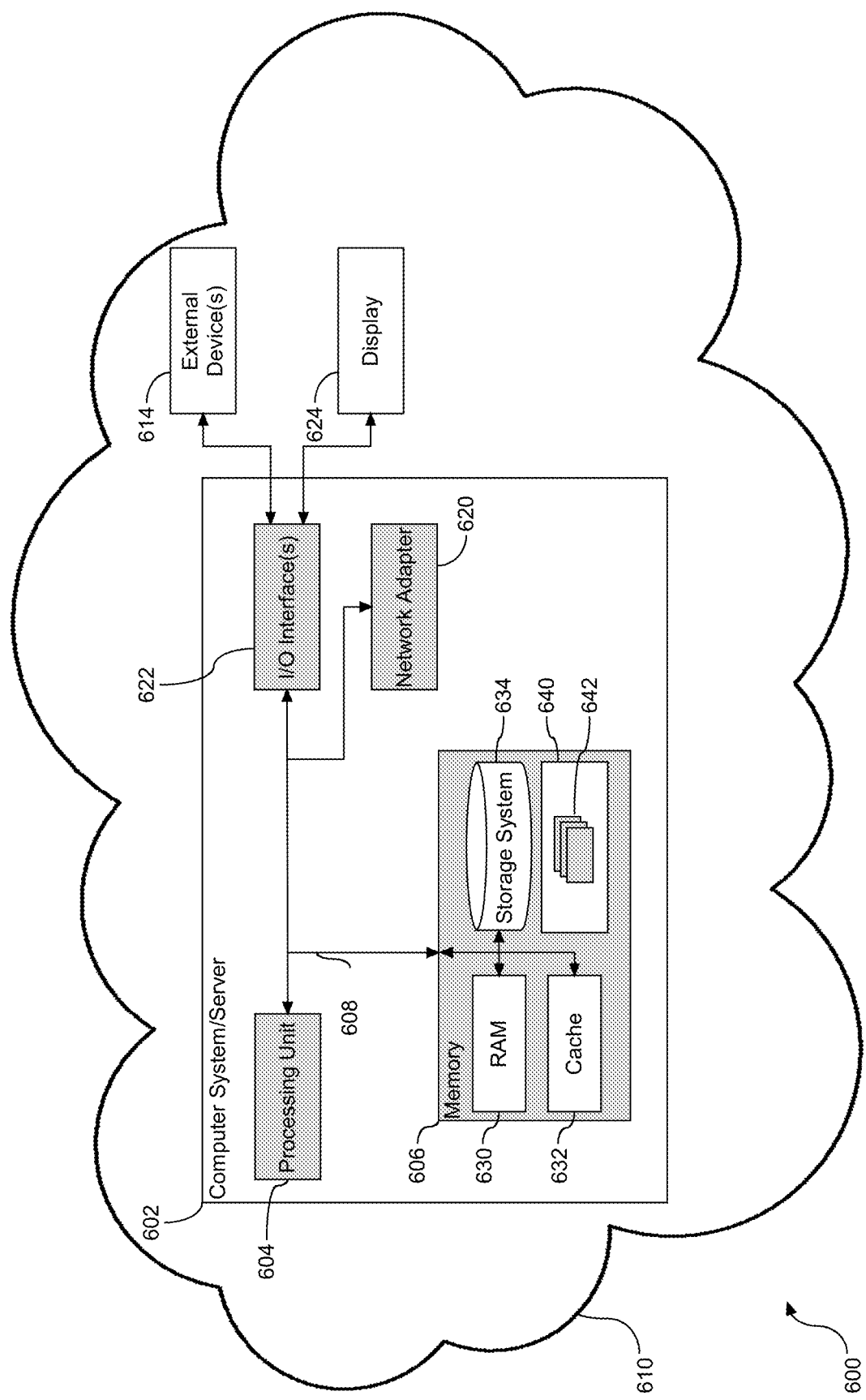
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically communication evaluation interrogatory identification and processing. For example, the set of program modules (642) may include the tools (152)-(156) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment (610). As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
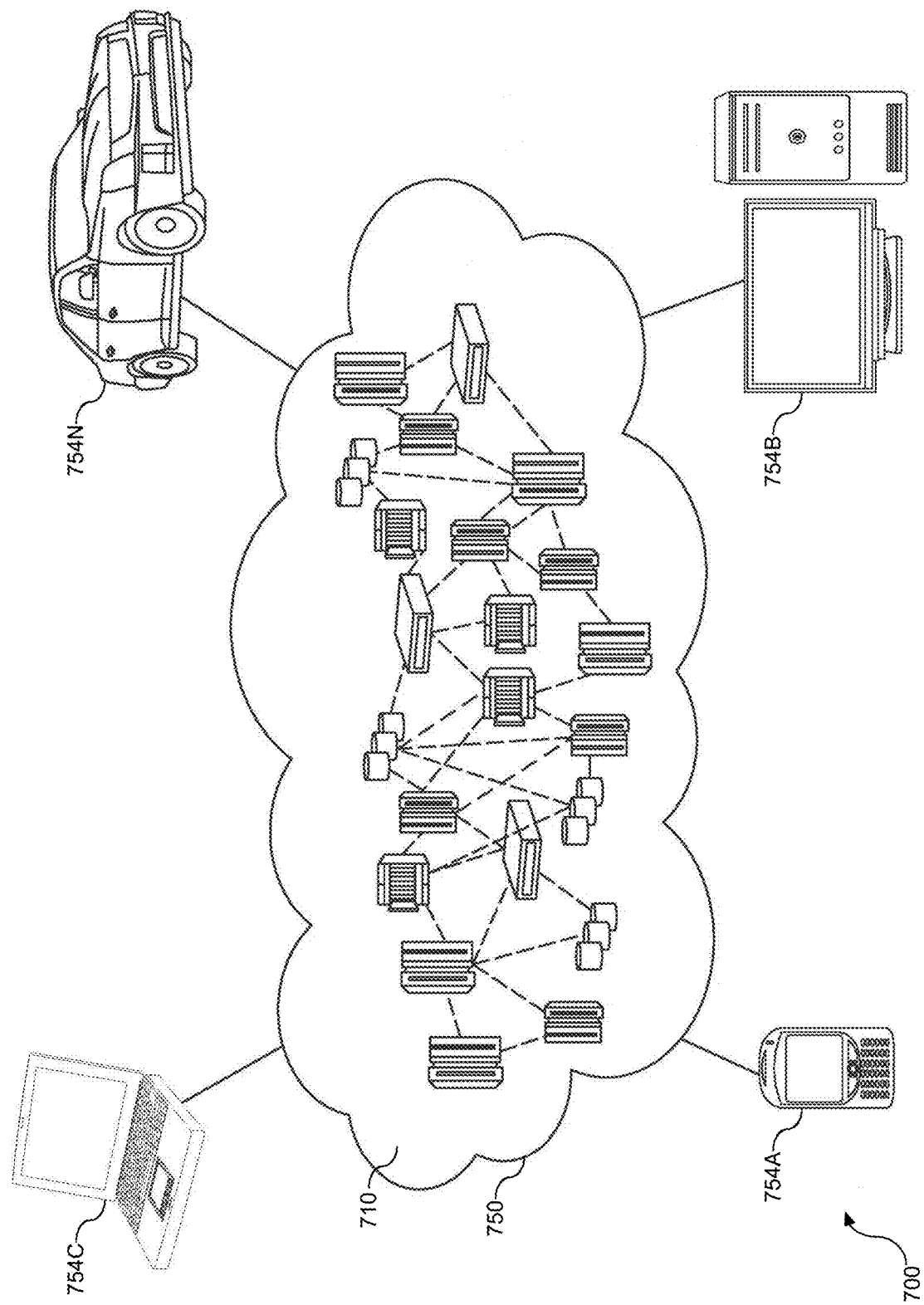
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
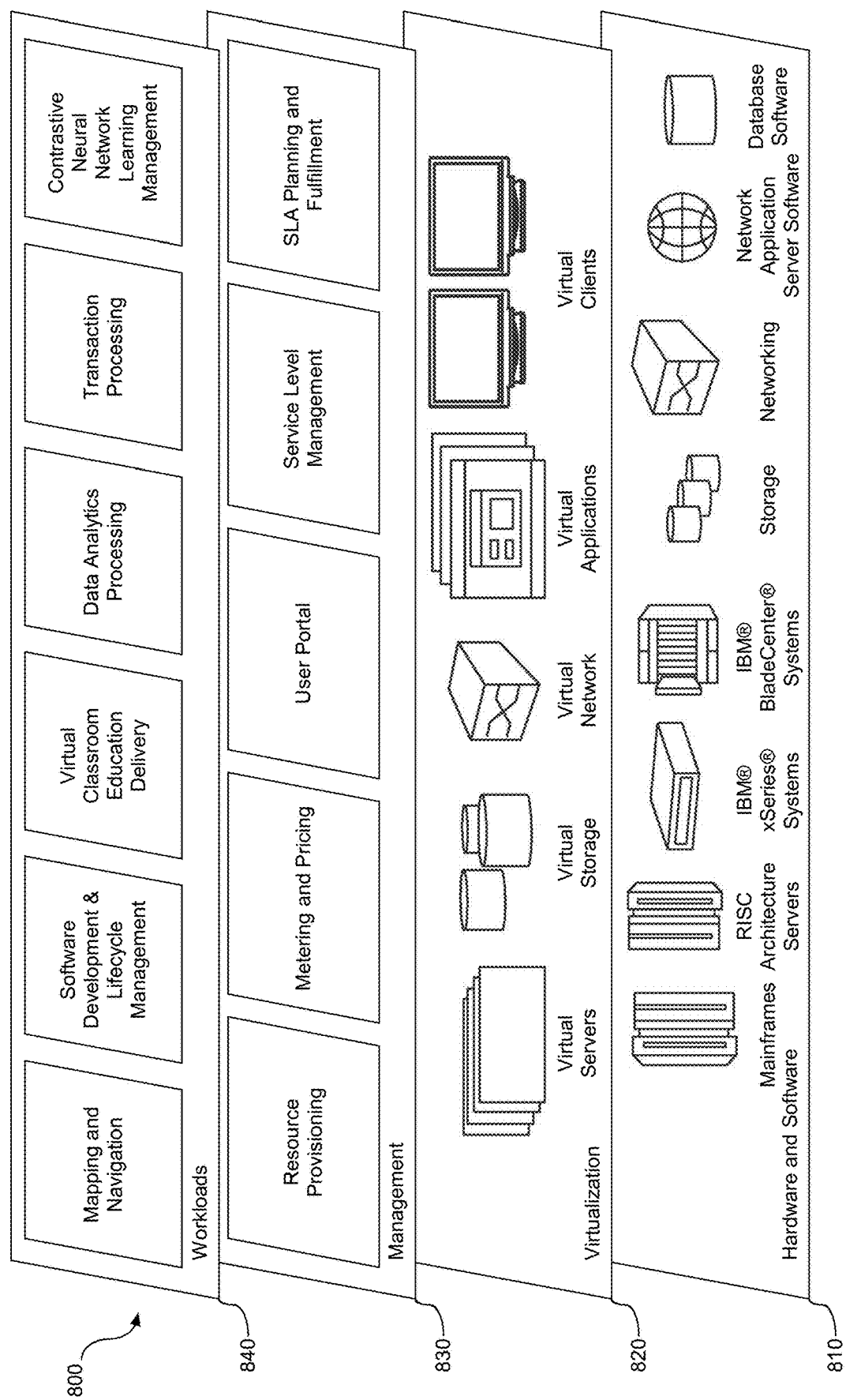
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and contrastive neural network learning management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an artificial intelligence platform, and more specifically to train a contrastive neural network in an active learning environment.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processor operatively coupled to memory; and
an artificial intelligence (AI) platform, in communication with the processor, the AI platform having machine learning (ML) tools to train a contrastive neural network (CNN), the tools comprising:
a pre-training manager configured to select a neural network, feed a first dataset including labeled data into the neural network, and pre-train the selected neural network with the labeled data of the first dataset, including the pre-training manager configured to train weights of layers of the selected neural network;
a training manager, operatively coupled to the pre-training manager, configured to train the CNN for a second dataset, including to:
borrow first weights of a first knowledge operator from the pre-trained neural network;
identify features novel to the second dataset, including second weights of a second knowledge operator; and
combine the first weights with the second weights; and
a prediction manager, operatively coupled to the training manager, configured to leverage the CNN to predict one or more labels for the second dataset as output data.

2. The computer system of claim 1, wherein the training manager is further configured to identify and extract one or more novel patterns in the second dataset and absent from the first dataset prior to training the CNN, and to de-noise the second dataset, wherein de-noising includes masking irrelevant information while preserving the novel patterns.

3. The computer system of claim 2, wherein the training manager is further configured to organize the identified one or more novel patterns in the de-noised second dataset into two or more clusters, and to selectively evaluate the two or more clusters for prediction accuracy.

4. The computer system of claim 3, wherein the training manager is further configured to dynamically select a cluster of the two or more clusters from which samples of labeling will be drawn for annotation based on a characteristic associated with the prediction accuracy of the cluster.

5. The computer system of claim 4, wherein the training manager is further configured to update the prediction accuracy of the cluster responsive to the annotation.

6. The computer system of claim 1, wherein the training manager is further configured to identify and extract one or more novel patterns in the second dataset and absent from the first dataset prior to training the CNN, and to de-noise the second dataset, wherein de-noising includes masking patterns of the second dataset that are common to the first dataset while preserving the novel patterns.

7. The computer system of claim 1, wherein the first dataset is a historical dataset and the second dataset is a new dataset.

8. A computer program product to train a contrastive neural network (CNN) in an active learning environment, the computer program product comprising:
a computer readable storage medium having program code embodied therewith, the program code executable by a processor to:
select a neural network, feed a first dataset including labeled data into the neural network, and pre-train the selected neural network with the labeled data of the first dataset, including train weights of layers of the selected neural network;
train the CNN for a second dataset, including to transfer knowledge from the trained weights of the selected neural network, including to:
borrow first weights of a first knowledge operator from the pre-trained neural network;
identify features novel to the second dataset, including second weights of a second knowledge operator; and
combine the first weights with the second weights; and
leverage the CNN to predict one or more labels for the second dataset as output data.

9. The computer program product of claim 8, further comprising program code executable by the processor to identify and extract one or more novel patterns in the second dataset and absent from the first dataset prior to training the contrastive neural network, and to de-noise the second dataset, wherein de-noising includes masking irrelevant information while preserving the novel patterns.

10. The computer program product of claim 9, further comprising program code executable by the processor to organize the identified one or more novel patterns in the de-noised second dataset into two or more clusters, and to selectively evaluate the two or more clusters for prediction accuracy.

11. The computer program product of claim 10, further comprising program code executable by the processor to dynamically select a cluster of the two or more clusters from which samples of labeling will be drawn for annotation based on a characteristic associated with the prediction accuracy of the cluster.

12. The computer program product of claim 11, further comprising program code executable by the processor to update the prediction accuracy of the cluster responsive to the annotation.

13. The computer program product of claim 8, further comprising program code executable by the processor to identify and extract one or more novel patterns in the second dataset and absent from the first dataset prior to training the contrastive neural network, and to de-noise the second dataset, wherein de-noising includes masking patterns of the second dataset that are common to the first dataset while preserving the novel patterns.

14. The computer program product of claim 8, wherein the first dataset is a historical dataset and the second dataset is a new dataset.

15. A method comprising:
selecting a neural network;
feeding a first dataset including labeled data into the neural network;
pre-training the selected neural network with the labeled data of the first dataset, the pre-training including training weights of layers of the selected neural network;
training a contrastive neural network (CNN) in an active learning environment for a second dataset while transferring knowledge from the trained weights of the selected neural network, including:
borrowing first weights of a first knowledge operator from the pre-trained neural network;
identifying features novel to the second dataset, including second weights of a second knowledge operator; and
combining the first weights with the second weights; and
leveraging the CNN to predict one or more labels for the second dataset as output data.

16. The method of claim 15, further comprising identifying and extracting one or more novel patterns in the second dataset and absent from the first dataset prior to training the contrastive neural network, and de-noising the second dataset, wherein de-noising includes masking irrelevant information while preserving the novel patterns.

17. The method of claim 16, further comprising organizing the identified one or more novel patterns in the de-noised second dataset into two or more clusters, and selectively evaluating the two or more clusters for prediction accuracy.

18. The method of claim 17, further comprising dynamically selecting a cluster of the two or more clusters from which samples of labeling will be drawn for annotation based on a characteristic associated with the prediction accuracy of the cluster.

19. The method of claim 15, further comprising identifying and extracting one or more novel patterns in the second dataset and absent from the first dataset prior to training the contrastive neural network, and de-noising the second dataset, wherein de-noising includes masking patterns of the second dataset that are common to the first dataset while preserving the novel patterns.

20. The method of claim 15, wherein the first dataset is a historical dataset and the second dataset is a new dataset.

* * * * *